United States Patent [19]
Kehl et al.

[11] 4,365,840
[45] Dec. 28, 1982

[54] SEAT WITH BACK CUSHION ATTACHMENT

[75] Inventors: Norman J. Kehl, Elk Grove Village; Richard C. Magnuson, Island Lake, both of Ill.

[73] Assignee: Coach & Car Equipment Corporation, Elk Grove Village, Ill.

[21] Appl. No.: 202,051

[22] Filed: Oct. 30, 1980

[51] Int. Cl.³ ............................................. A47C 4/02
[52] U.S. Cl. .................................... 297/443; 297/232; 297/444; 297/460
[58] Field of Search ............... 296/63; 297/443, 444, 297/232, 460, 452, 440, 450, DIG. 6

[56] References Cited

U.S. PATENT DOCUMENTS

| | | | |
|---|---|---|---|
| 2,047,682 | 7/1936 | Grinnell | 297/443 X |
| 2,153,155 | 4/1939 | Page et al. | 297/443 X |
| 3,220,767 | 11/1965 | Hendrickson | 297/DIG. 6 |
| 3,288,529 | 11/1966 | Koch | 297/444 X |
| 3,625,565 | 12/1971 | Barecki | 297/450 |
| 3,632,159 | 1/1972 | Barecki | 296/63 |
| 4,023,860 | 5/1977 | Harder, Jr. | 297/444 X |
| 4,065,182 | 12/1977 | Braniff et al. | 297/460 X |
| 4,079,994 | 3/1978 | Kehl | 297/444 X |
| 4,153,293 | 5/1979 | Sheldon | 297/460 X |
| 4,275,925 | 6/1981 | Harder, Jr. | 297/444 |

Primary Examiner—James T. McCall
Attorney, Agent, or Firm—Merriam, Marshall & Bicknell

[57] ABSTRACT

A seat has a frame including a back portion. A seat cushion, a back cushion and a back shroud are all mounted on the frame. Attached to the rear of the back cushion, near the bottom thereof, are a pair of clips which hookingly engage a pair of tabs on the frame and mount the back cushion for vertical sliding movement on the tabs. Attached to the rear of the back cushion, near the top thereof, is a bracket which is attached by a fastener to a cross member at the top of the frame's back portion. The operation of fastening the bracket to the cross member raises the back cushion in vertical sliding movement on the tabs.

7 Claims, 6 Drawing Figures

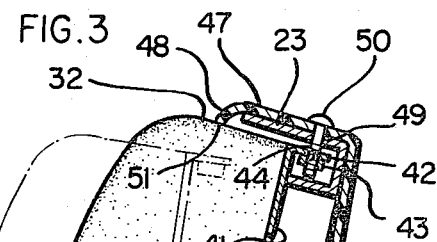
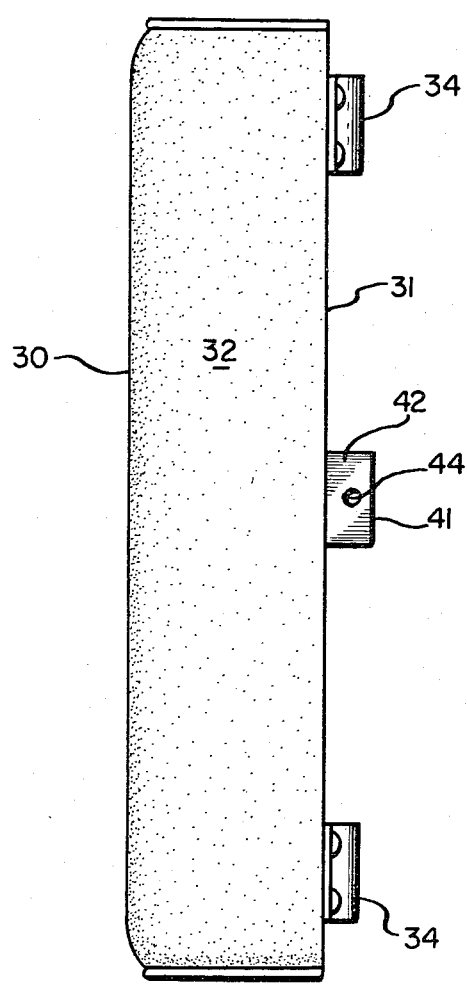
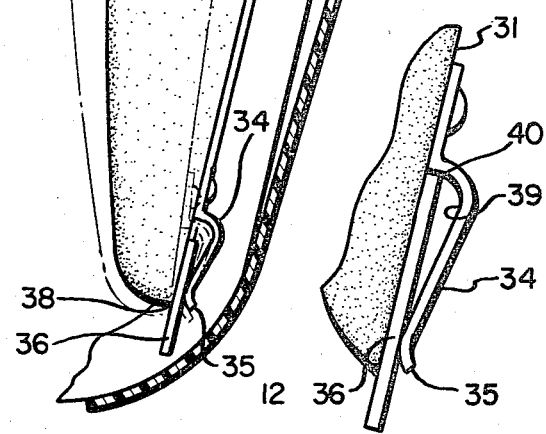
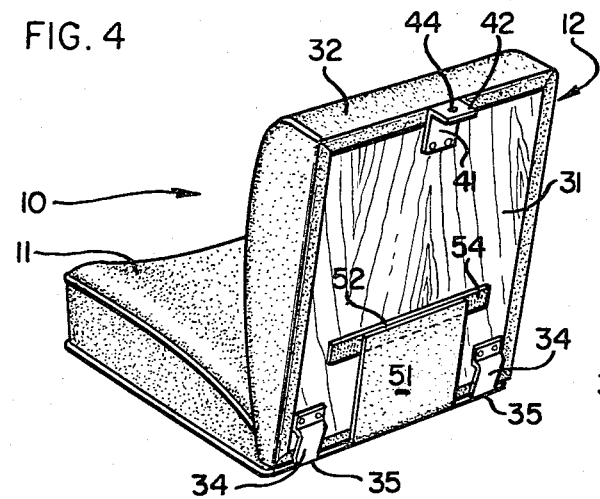
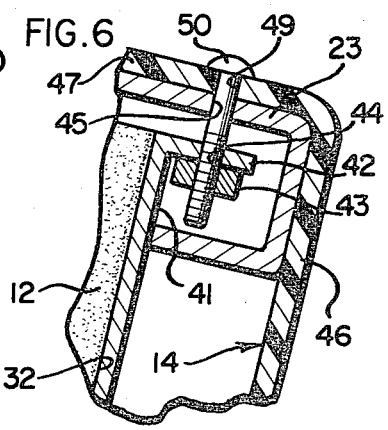

SEAT WITH BACK CUSHION ATTACHMENT

BACKGROUND OF THE INVENTION

The present invention relates generally to seats for mass transit vehicles, such as buses or subway cars, and more particularly, to back cushion attachments for such seats.

Such seats usually comprise a frame on which is mounted a seat cushion and a back cushion. The back of the frame is usually covered by a back shroud, for aesthetic purposes. The back cushion usually includes a rigid back member which is attached to the frame with fasteners usually located adjacent the bottom and the top of the rigid back member. In conventional seats, access to the fasteners which attach the lower part of the rigid back member to the frame is difficult. If these fasteners are accessible from the rear, the back shroud interferes with such access, while, if these fasteners are accessible from the front, the seat cushion interferes with such access. If the fasteners are positioned so that they are exposed to view, they invite vandalism.

SUMMARY OF THE INVENTION

A seat having a back cushion attachment in accordance with the present invention eliminates the drawbacks and difficulties of the conventional seats described above. The back cushion is easily removable without inviting vandalism. It is unnecessary to remove the seat cushion or the back shroud to obtain access to the fasteners or any other elements used for attaching the back cushion to the frame. All fasteners at the bottom of the back cushion have been eliminated, thereby eliminating the difficulties of access thereto, whether from the front or from the rear. The back cushion attachment is also relatively non-tamperable This back cushion attachment comprises a pair of spaced-apart clips adjacent the bottom of the back cushion's rear member, with each of these clips depending from the rear member and terminating at a free end. Located adjacent the bottom of each of a pair of vertically extending frame members on the back portion of the seat frame are a pair of spaced-apart tabs. Each clip hookingly engages one of the tabs from above to mount the back cushion for essentially pivotal movement about the tabs between a relatively forwardly inclined first position and a relatively upright second position. The clips are composed of resilient, springable material, and when the back cushion is in its upright position, the clips grippingly engage the tabs.

Also attached to the rear member of the back cushion is a bracket located substantially above the clips. This bracket is attachable by a fastener to an upper cross member on the frame's back portion. The clips mount the back cushion for vertical sliding movement on the tabs, and, when the bracket on the top of the rigid member is fastened to the cross member on the back frame, the back cushion is raised, in vertical sliding movement, a short distance during the course of the fastening operation. A special tool is required to manipulate the fastener. This tool may be a phillips head screwdriver, or the like, and hence the fastener is not readily manipulable by vandals. Because the back cushion has only one fastener, and because this fastener is relatively non-tamperable, the back cushion may not be readily removed by vandals.

To remove the back cushion for servicing or replacement, one need merely remove the fastener which connects the bracket at the top of the back cushion to the seat frame, using the special tool, and then, pushing slightly downwardly, merely pivot and lift the back cushion to disengage the clips from the tabs at the bottom of the frame.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 2 is a top view of the back cushion of FIG. 1;

FIG. 3 is a side elevational view, partially in section, of a seat in accordance with the present invention;

FIG. 4 is a perspective, viewed from the rear of a seat having a back cushion attachment in accordance with the present invention;

FIG. 5 is an enlarged fragmentary view showing a portion of the back cushion attachment.

FIG. 6 is an enlarged fragmentary view showing the upper portion of the back cushion attachment.

DETAILED DESCRIPTION

Figure 1:
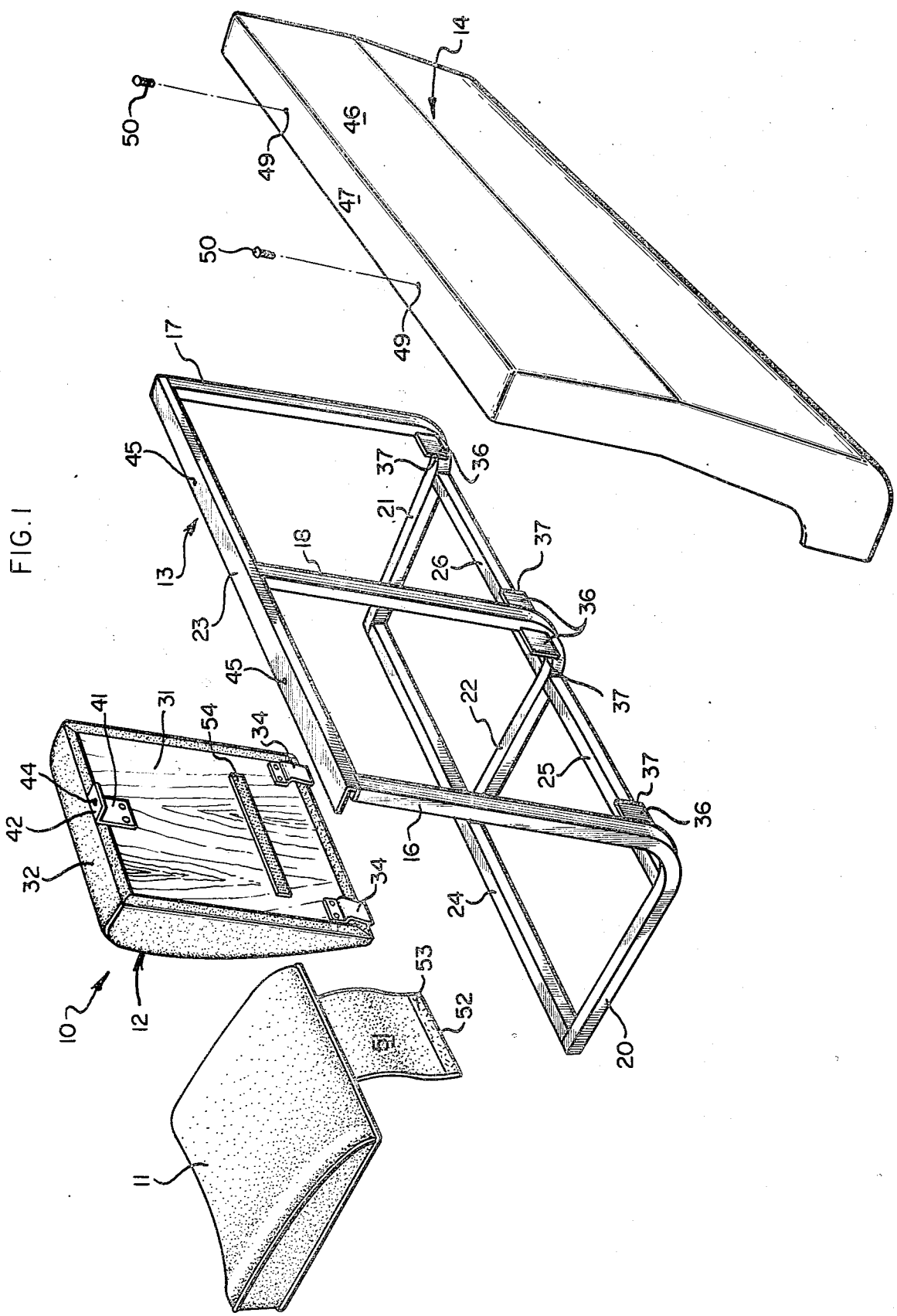
FIG. 1 is an exploded perspective of a seat having a back cushion attachment in accordance with an embodiment of the present invention.

Referring initially to FIGS. 1 and 4, indicated generally at 10 is a seat having a seat cushion 11 and a back cushion 12 both of which are mounted on a frame 13 to the back of which is mounted a back shroud 14.

Referring to FIGS. 1, frame 13 comprises a pair of spaced apart, vertically extending side members 16,17 and a vertically extending center member 18. Extending forwardly from side members 16,17 are respective horizontally extending side members 20,21, and extending forwardly from vertically extending center member 18 is a horizontally extending center member 22. Extending between the upper parts of vertically extending side members 16,17 is an immovable upper cross-member 23 having openings 45,45, and extending between the front parts of horizontally extending side members 20,21 is a lower front cross-member 24. Extending between the rear parts of horizontally extending members 20,22 is one rear cross-member 25, and extending between the rear part of horizontally extending members 21,22 is another rear cross-member 26.

With reference again to FIGS. 1–4, back cushion 12 comprises a front surface portion 30, a rear member 31 composed of a rigid material such as wood, and a top surface portion 32 extending rearwardly from front surface portion 30 and terminating at rear member 31. Attached to rear member 31, adjacent the bottom thereof, are a pair of spaced-apart claips 34,34. Each clip 34 depends from rear member 31 and terminates at a free end 35.

Located adjacent the bottom of vertically extending side frame members 16,17, are tabs 26,26 each facing inwardly relative to the frame. Located at the bottom of vertically extending center frame member 18 are a pair of tabs 36,36, each facing a respective tab 36 on one of the vertically extending frame member and extends therefrom toward a tab fixed on another vertically extending frame member. Each tab 36 terminates at a free end 37. Each tab 36 lies in a substantially vertical plane and is at the same elevation as all the other tabs 36.

Each tab 36 is composed of a rigid material, such as steel or some other rigid metal, and each clip 34 is composed of a resilient, a springable material, such as spring steel. Each clip 34 comprises structure for hookingly engaging one of the tabs 36 from above and for mounting back cushion 12 for essentially pivotal movement about a pair of tabs 36,36 between a relatively forwardly inclined first position (dash-dot lines in FIG. 3) and a relatively upright second position.

Back cushion 12 is attached to frame 13 by initially inclining back cushion 12 slightly forwardly and hookingly engaging clips 34 with a pair of facing tabs 36,36. The back cushion is then pivoted rearwardly, about a pivot line located substantially at the lower rear edge 38 of the back cushion (FIG. 3) until the back cushion is in a substantially upright position whereupon each clip 34 is allowed to slide downwardly on its tab 36 until the top edge of tab 36 engages the inside surface 39 of clip 34, at 40 (FIG. 5). Clips 34,34 comprise structure for mounting back cushion 12 for vertical sliding movement on tabs 36,36.

The upper part of back cushion 12 is attached to the upper cross-member 23 on frame 13 utilizing structure now to be described. Attached to rear member 31, at a location above clips 34,34, and near the top of rear member 31 in the illustrated embodiment, is a bracket 41 having an outwardly extending flange 42 containing an opening 44 below which is fixed a weld nut 43.

Referring now to back shroud 14 (FIGS. 1 and 3), the shroud comprises a main body portion 46, a top flange 47 extending forwardly from main body portion 46, and a lip 48 depending from the top of front flange 47 (FIG. 3). Located in top flange 47 are a pair of openings 49,49. When back shroud 14 is assembled onto seat frame 13, main body portion 46 of the back shroud is located behind vertically extending frame members 16,17,18. As shown in FIGS. 3 and 6, back shroud top flange 47 overlaps upper cross member 23 of frame 13 and extends forwardly of rear member 31 on back cushion 12. In this disposition, each opening 49 in top flange 47 on back shroud 14 is aligned with an opening 45 on the frame's upper cross member 23 and with opening 44 in the flange 42 of bracket 41 on back cushion 12. A fastener 50, such as a phillips head screw, is inserted through an opening 49 in the top flange 47 of the back shroud, through an opening 45 in top cross member 23, through opening 44 in flange 42 of bracket 41 and through a weld nut 43 attached to the bottom of flange 42. As previously described, back cushion 12 is mounted for vertical sliding movement on tabs 36,36. When factor 50 is tightened, this raises cushion 12 in a vertical sliding movement, until the bottom edge 51 of depending lip 48 on back shroud 14 abuts top portion 32 of back cushion 12. This is the position illustrated in full lines in FIG. 3.

Each slip 34 comprises structure for gripping a respective tab 36 when back cushion 12 is in its upright position, and clips 34,34 and tabs 36,36 comprise structure cooperating to impart a spring tension to the clips when the back cushion is in its upright position, to enhance the gripping action of the clips on the tabs.

Back cushion 12 can be disassembled from frame 13 by reversing the assembly procedure described above. In the disassembly procedure, fastener 50 is removed, allowing back cushion 12 and clips 34,34 to be slid downwardly on tabs 36, 36 from the upper position illustrated in full lines in FIG. 3 to the lower position illustrated in FIG. 5. Following this, the back cushion is lifted slightly and then pivoted forwardly about pivot edge 38 (FIGS. 3 and 5) to disengage clips 34,34 from tabs 36,36. Clips 34,34 are in hooking engagement with tabs 36,36 in both the upper position of back cushion 12 (full lines in FIG. 3) and the lower position of back cushion 12 (FIG. 5).

When back cushion 12 is in the lower position illustrated in FIG. 5, there is an unsightly gap between bottom edge 51 of front lip 48 on shroud 14 and top portion 32 of back cushion 12. This gap is eliminated when back cushion 12 is raised to the upper position shown in full lines in FIG. 3 during the fastening operation involving bracket 41. This gap is desirable to accommodate the initial assembly of the back cushion onto the frame and to accommodate removal of the back cushion from the frame (dash dot lines in FIG. 3).

Seat cushion 11 is supported atop frame members 20–22 and 24–26 and is connected to back cushion 12 with structure to be described below. More particularly, extending from the rear of seat cushion 11 is a flexible flap 51 terminating at a free end 52. Located adjacent free end 52 is a marginal portion 53 composed of releasably adhering material, such as that sold under the trademark "Velcro". Located on the rear surface of rear member 31 of back cushion 12 is a strip 54 composed of the same type of releasably adhering material as marginal portion 53. Marginal portion 53 and strip 54 comprise means for releasably adhering marginal portion 53 to rear member 31 (see FIG. 4). As a result of this connection, seat cushion 11 is held against disassembly from back cushion 12 for so long as back cushion 12 is mounted on the frame.

The embodiment of seat illustrated in the figures is a transverse seat in that the seat extends transversely from a wall of the vehicle rather than along the wall in which case the seat is known as a longitudinal seat and does not require a back shroud. In such a case, bracket 41 need not be mounted at the top of back member 31, as in the transverse seat shown in the figures, but may be spaced somewhat below the top of the back member. The cross member of the frame to which the bracket is fastened would also be located at a lower height to accommodate attachment thereof to the bracket. Otherwise, the structure, the fastening operation and the assembly of the back cushion on the frame would be essentially the same for a longitudinal seat as for the transverse seat shown in the figures.

The foregoing detailed description has been given for clearness of understanding only, and no unnecessary limitations should be undertood therefrom, as modifications will be obvious to those skilled in the art.

What is claimed is:

1. A seat comprising:

a frame including a pair of spaced-apart vertically extending members and an immovable upper cross member extending between the upper parts of said vertically extending members;

a back cushion having a front surface portion, a rigid rear member and a top surface portion extending rearwardly from said front surface portion and terminating at said rear member;

a pair of spaced-apart clips adjacent the bottom of said rear member, each of said clips depending from said rear member and terminating at a free end;

and a pair of spaced apart tabs located adjacent the bottom of one of said vertically extending frame members;

each of said clips comprising means for hookingly engaging one of said tabs from above and for mounting said back cushion for essentially pivotal movement about said tabs between a relatively forwardly inclined first position and a relatively upright second position;
each of said clips being composed of resilient, springable material;
each of said tabs being composed of rigid material;
each clip comprising means for gripping a respective tab when said back cushion is in its upright position.

2. A seat as recited in claim 1 and comprising:
a bracket attached to said rear member at a location above said clips;
means for attaching said bracket to said upper cross member on said frame;
a back shroud having a main body portion located behind said vertically extending frame members;
a top flange on said back shroud extending forwardly from said main body portion, overlapping said upper cross member on the frame and extending forwardly of the rear member on the back cushion;
a lip depending from the front of said top flange;
said clips further comprising means mounting said back cushion for vertical sliding movement on said tabs;
said attaching means comprising means for raising said back cushion, in said vertical sliding movement, until the bottom edge of said depending lips abuts said top portion of the back cushion.

3. A seat as recited in claim 1 and comprising:
a seat cushion;
said frame including means for supporting said seat cushion;
a flexible flap extending from the rear of said seat cushion and terminating at a free end;
a marginal portion adjacent said free end on the flexible flap;
and means on said marginal portion and on the rear member of said back cushion for releasably adhering said marginal portion to said rear member.

4. A seat as recited in claim 1 wherein:
each of said tabs is fixed on a respective one of said vertically extending frame members, extends therefrom toward the other tab and terminates at a free end.

5. A seat as recited in claim 1 wherein:
each of said tabs lies in a substantially vertical plane and is at the same elevation at the other tab.

6. A seat as recited in claim 1 wherein:
said clips and said tabs comprise means cooperating to impart a spring tension to said clips when the back cushion is in its upright position, to enhance the gripping action of said clips on said tabs.

7. A seat as recited in claim 1 and comprising:
a bracket attached to said rear member at a location above said clips;
and means for attaching said bracket to said upper cross member on said frame;
said clips further comprising means mounting said back cushion for vertical sliding movement on said tabs between upper and lower positions in both of which said clips are in hooking engagement with said tabs;
said attaching means comprising means for raising said back cushion, in said vertical sliding movement, from said lower position to said upper position.

* * * * *

UNITED STATES PATENT AND TRADEMARK OFFICE
CERTIFICATE OF CORRECTION

PATENT NO. : 4,365,840
DATED : December 28, 1982
INVENTOR(S) : Norman J. Kehl and Richard C. Magnuson It is certified that error appears in the above-identified patent and that said Letters Patent are hereby corrected as shown below:

Col. 1, line 36, following "non-tamperable" insert a period;

Col. 2, line 33, "FIGS." should be --FIG.--;

Col. 3, line 3, "a springable" should be --springable--;

Col. 3, line 51, "factor." should be --fastener--;

Col. 4 line 66, after "tabs" insert --each--;

Col. 5, line 23, "on the frame" should be --of the frame--

Col. 5, line 30, "lips" should be --lip--.

Signed and Sealed this

Twenty-sixth Day of April 1983

[SEAL]

Attest:

GERALD J. MOSSINGHOFF

Attesting Officer

Commissioner of Patents and Trademarks